United States Patent
Lasmarias et al.

(10) Patent No.: US 6,824,651 B2
(45) Date of Patent: Nov. 30, 2004

(54) TALC COMPOSITION AND USE IN PAPER PRODUCTS

(75) Inventors: Vicente Lasmarias, Highlands Ranch, CO (US); Shripal Sharma, Highlands Ranch, CO (US); Alexis Layne, Littleton, CO (US)

(73) Assignee: Luzenec America, Inc., Centennial, CO (US)

( * ) Notice: Subject to any disclaimer, the term of this patent is extended or adjusted under 35 U.S.C. 154(b) by 12 days.

(21) Appl. No.: 10/404,786

(22) Filed: Mar. 31, 2003

(65) Prior Publication Data

US 2003/0205344 A1 Nov. 6, 2003

Related U.S. Application Data

(63) Continuation of application No. 10/005,722, filed on Nov. 2, 2001, now Pat. No. 6,565,646.

(51) Int. Cl.[7] .......................... D21H 17/68; D21H 17/63
(52) U.S. Cl. .................... 162/181.6; 162/158; 162/175; 162/178; 162/172; 162/168.3
(58) Field of Search ........................... 162/181.1–181.6, 162/164.1, 168.3, 164.6, 168.2, 158, 175, 172, 178; 106/801, 287.1, 286.6, 469

(56) References Cited

U.S. PATENT DOCUMENTS

| | | | |
|---|---|---|---|
| 4,295,933 A | 10/1981 | Smith | 162/168.3 |
| 4,495,245 A | 1/1985 | Zunker | 428/403 |
| 4,710,270 A | 12/1987 | Sunden et al. | 162/175 |
| 5,244,542 A | 9/1993 | Bown et al. | 162/164.3 |
| 5,454,864 A * | 10/1995 | Whalen-Shaw | 106/416 |
| 5,458,679 A * | 10/1995 | Fairchild | 106/465 |
| 5,492,560 A | 2/1996 | Fairchild | 106/204.01 |
| 5,516,405 A | 5/1996 | De Witt | 162/164.1 |
| 5,972,100 A | 10/1999 | Dumas | 106/501.1 |
| 6,033,524 A | 3/2000 | Pruszynski et al. | 162/165 |
| 6,565,646 B1 * | 5/2003 | Lasmarias et al. | 106/801 |
| 2003/0096143 A1 * | 5/2003 | Lasmarias et al. | 428/702 |
| 2004/0065419 A1 * | 4/2004 | Lasmarias et al. | 162/5 |

FOREIGN PATENT DOCUMENTS

WO  WO 01/86067  11/2001

OTHER PUBLICATIONS

R. A. Gil in "Applications of Wet–End Paper Chemistry: Fillers for papermaking" 1995, Blackie Academic & Profeesional, Edited by Che On Au and Ian Thorn; pp 54–59.*

* cited by examiner

Primary Examiner—José A. Fortuna
(74) Attorney, Agent, or Firm—Sheridan Ross P.C.

(57) ABSTRACT

This invention discloses a talc additive for use as a filler in making paper products which is useful in preventing dusting or linting of paper. Also disclosed is a method of making the additive and using it in making paper.

14 Claims, No Drawings

TALC COMPOSITION AND USE IN PAPER PRODUCTS

CROSS REFERENCE TO RELATED APPLICATION

The present application is a continuation of U.S. patent application Ser. No. 10/005,722, filed Nov. 2, 2001, now U.S. Pat. No. 6,565,646, entitled "TALC COMPOSITION AND USE IN PAPER PRODUCTS," which is incorporated herein by this reference.

FIELD OF THE INVENTION

This invention relates generally to the field of talc and more specifically relates to the use of a treated talc in paper products.

BACKGROUND OF THE INVENTION

In the field of offset printing, the ink is first transferred from the printing plate to a blanket and then from the blanket to paper. This offset mode is also used commercially for printing letterpress, called dry offset, or gravure, called offset gravure. In offset printing, some picking of fibers or fillers from the paper surface, called linting or dusting, is normal due to some stiff, unfibrillated fibers that are not completely bonded to the sheet. Offset linting or dusting is a sheet surface phenomenon. However, these fibers and fillers because they are loosely bound to the paper can be transferred to the blanket, which will cause printing imperfections in resultant copies and inferior print copy. In addition, excessive linting or dusting will also lead to increased blanket maintenance. Thus, offset printers desire to use paper which does not lint or dust excessively.

In the paper-making process, cellulosic fibers are softened with water before being processed into paper. Fillers such as clay, titanium dioxide, talc, and calcium carbonate, are added to the papermaking process to improve paper properties such as opacity, brightness, and printability. Each filler is unique due to differences in physico-chemical and morphological properties. One example of a substance which will reduce linting or dusting is clay. Titanium dioxide is an excellent filler for opacity purposes due to is high refractive index and particle size. Due to its hydrophobicity, talc is an excellent pitch/stickie control. In addition, talc is an excellent filler for purposes of improving machine drainage, sheet smoothness and printability. However, as a filler, talc does not affiliate with the water-based cellulosic fibers as well as certain other fillers that are more hydrophilic. Thus, a method of modifying talc's affinity to the cellulosic fibers of the raw paper is needed.

SUMMARY OF THE INVENTION

This invention discloses a sized and treated talc composition that is useful in preventing dusting or linting of paper when such talc is added to paper pulp during the paper making process. Also disclosed is a method of preparation of the talc of the present invention and its use in making paper. More particularly, the talc of the present invention is milled to have a particle size of less than 10 micrometers and a cationic charge to the surface of the talc particles. For example, a cationic charge can be added to the particle by mixing talc particles with water to create a slurry and, adding a cationic compound to the slurry. In preferred embodiments, the cationic compound is selected from cationic wet-end starch, cationic wax-based emulsion, polydadmacs and carboxymethylcellulose. Also, preferably, the talc particles have a top size of less than about 1.5% and a particle size of about 5 microns.

The present invention is also directed to a paper product which includes the talc composition of the present invention and a method for making such a paper product. The method includes adding the talc additive to a paper pulp and forming the paper pulp into a paper product.

DETAILED DESCRIPTION OF THE INVENTION

The present invention is directed to a treated talc composition, a method of making the same and use of the composition as a filler in making paper. The use of untreated talc in the paper making process is well known and has been performed for many years. However, the use of untreated talc results in linting and dusting problems. Talc is more prone to linting or dusting than clay or other fillers due to talc's hydrophobicity and chemically inert planar surface. Some paper making mills add a strengthener, such as starch, to the paper pulp mixture in order to improve the surface strength of the paper and overcome linting. However, the addition of such a strengthener can affect the cost and the processing of the paper pulp. The process of the present invention for making the treated talc composition includes processing talc to a talc particle size of less then 10 micrometers in diameter, and imparting a cationic charge to the surface of the talc particles.

Talc, in its unadulterated form, is a platy mineral, meaning that talc will crystallize in a thin sheet and will tend to flake along cleavage planes. Talc can be processed as part of the present invention by any suitable method. For example, one such method is by milling talc with an air classified mill ("ACM"). Here, the talc is dry and is hammered to achieve a desired particle size distribution curve. The talc particles are then screened to the desired median particle size. The ACM process produces more fractured talc particles than delaminated talc particles. Another talc milling method is a fluidized energy method ("FEM"). Here, the talc is mixed into a slurry with water such that the talc is held in suspension and the talc particles are sorted to achieve the right particle size distribution curve. Although both methods will produce talc that is suitable for use in the present invention, talc produced by ACM processing is preferred because it produces a talc material with a lower top size (i.e., the quantity of particles retained on a 325-mesh screen or greater than 45 microns in diameter). The advantages of a smaller top size are discussed in more detail below.

A cationic charge is imparted to the surface of the talc particles. In this manner, it is believed that the ability of the talc to adhere to the paper surface is improved to achieve reduced dusting and/or linting during offset printing. In preferred embodiments, the cationic charge on the talc particles is retained during reslurrying, such as during a paper making process, and more preferably, the cationic charge on the talc particles is retained in the presence of anionic trash (filtrate from a groundwood pulp). The step of imparting a cationic charge to the surface of the talc particles can be accomplished by mixing the talc particles with water to create a slurry and, adding a cationic compound to the slurry. The cationic compound can be any suitable cationic compound and in particular, can be cationic wet-end starch, cationic wax-based emulsion, polydadmacs and carboxymethylcellulose.

In another aspect of the invention, the talc particles in the talc composition have a top size of less than about 1.5%, more preferably less than about 1.0%, and even more preferably, less than about 0.5%. As noted above, the term top size refers to the weight percentage of the talc particles in a given composition which are retained on a 325-mesh screen or are greater than 45 microns in diameter. In preferred embodiments, talc compositions in accordance with the top size parameters of the present invention are prepared by milling in an air classified mill process. As demonstrated in the Examples, it has been found that use of talc compositions in accordance with the top size parameters of the present invention significantly reduces linting and dusting during offset printing.

As noted above, the process of the present invention includes processing talc to a talc particle size of less then 10 micrometers in diameter. In a further aspect of the present invention, the talc particles in the talc composition can have a median particle size of about 7 microns, and in a further embodiment, can have a median particle size of about 5 microns. It has been found that particle size of the talc composition has varying effects on its use as a filler in making paper. For example, as demonstrated in the Examples, larger particle sizes, such as 10 microns and 7 microns, produce faster drainage of liquid during paper production. It is believed this effect on drainage is achieved because the larger particle sizes open up the wet web during sheet forming allowing faster drainage. Alternatively, smaller particle sizes, such as 5 microns provide porosity and sheet gloss benefits.

The present invention is also directed to a method of making a paper product which includes adding a talc additive of the present invention to a paper pulp and forming the paper pulp into a paper product. In any given paper making process, various stages are set for additives to be mixed with the cellulose fibers that make up paper pulp. When talc is used as an additive to the paper, the talc is processed through three stages before reaching the paper pulp. The talc is prepared in a unit which is typically called a talc dispersion unit. The talc is mechanically sheared in the talc dispersion unit. From the talc dispersion unit, the talc enters into a storage chest. From the storage chest, the talc is processed through a talc delivery line where it is finally added to the paper pulp. According to the present invention, the talc additive can be prepared by imparting a cationic charge to the surface of the talc particles at any of the three stages, either at the talc dispersion unit, the talc storage chest, or in the talc delivery pipe. Further, the steps of adding a talc additive to a paper pulp and forming the pulp into a paper product are conducted according to conventional processes.

The following examples are provided for the purposes of illustration and are not intended to limit the scope of the present invention.

EXAMPLES

The compounds used in all of the experiments are delineated in Table 1.

TABLE 1

| Compounds | Supplier | Functionality | pH | Mol. Weight | Charge Density |
|---|---|---|---|---|---|
| PRP 5228 | Chemtall (Pearl River Polymers) | MF-based* | 1.5–2.0 | Low | Low |
| PRP 4440 | Chemtall (Pearl River Polymers) | Polydadmac | 4–8 | Med | Med |
| ECCat 2010 | Nalco | Polydadmac | | High | High |
| MicroCAT 300 | National Starch | Modified Starch | 6 (in solution) | | |
| Imprint DS | Ciba-Geigy | Paraffin Wax | 5 | | |
| Acrysol ® | Rohm & Haas | Polyurethane Resin | 6.0–8.0 | | |
| Finnfix or Cellufix | Noviant | Sodium Carboxymethyl Cellulose | 6–8 (in solution) | | |
| Percol 292 | Ciba-Geigy | Quaternary Acrylate Salt and Acrylamide | 3.8 (in solution) | High | Low |
| Poly-DADMAC | Mutek | Poly-diallyl-dimethyl-ammouniumchloride | 6.0–8.0 | | |
| PRP 5333 | Chemtall (Pearl River Polymers) | 2-hydroxyethyl-formaldehyde | 1.0–2.0 | | |
| PRP 4635 | Chemtall (Pearl River Polymers) | cationic polymer in solution | 4.0–8.0 | | |
| Hydrocol 2D7 | Ciba-Geigy | Hydrated Aluminum Silicate and Crystalline Quartz | 10.0 | | |
| Hercobond Dowfax WP 310 | Hercules Dow | Polyether Polyol | | | |

*The PRP 5228 compound is a melamine-formaldehyde (MF) hydrochloride polymer.

Example 1

A talc slurry was treated with cationic polymers, dried and re-slurried to simulate talc treatment in a paper-making plant. Three types of chemicals were used to modify the surface of the talc, a surfactant, a dry strength resin and CMC. The talc slurry was prepared by dissolving 40 dry grams of talc in 180 grams of a water-cationic compound mixture in a Dispermat mixer for 10 minutes. The water-cationic compound mixture was prepared by mixing 20 grams of the active chemical in distilled water. In preparing the starch solution, a 4% slurry of starch and distilled water was cooked and stirred in a water bath maintained at 95° Celsius for 30 minutes. The talc's cationic charge was determined before and after drying and after re-slurrying to determine cation charge retention. In order to determine the charge, immediately after preparation of the talc slurry, a 10 milliliter sample was titrated to its end-point with a 0.001N polydadmac solution using a Mutek Particle Charge Detector ("PCD") tester. The amount of polydadmac titrant consumed in the titration is multiplied by 100 in order to express the results in $\mu$eq/L. The remainder of the talc slurry was filtered through a Buchner funnel using a #4 Whatman filter pad. A 10 milliliter sample of the filtrate was then titrated and measured using a Mutek PCD. The charge of the talc is then determined by subtracting the unfiltered talc solution charge from the filtered talc solution charge. The talc particles retained on the filter pad were dried overnight in an oven maintained at 105° Celsius and reslurried in distilled water to 20 wt. % solids. The results of this test are contained in Table 2.

TABLE 2

Cationic Charge (μeq/L) of Treated Talc

|  | PRP 5228 | PRP 4440 | ECCat 2010 |
|---|---|---|---|
| Run 1: | | | |
| Total | 330 | >1500 | >1500 |
| Aqueous | Anionic | >1500 | >1500 |
| Talc | 330 | ND | ND |
| Run 2: (After drying and reslurrying) | | | |
| Total | −15 | 1140 | Negative (Lost the Charge) |
| Aqueous | ND | 90 | ND |
| Talc | ND | 1050 | ND |

ND = Not Determined

As Table 2 shows, only the PRP 4440 treated talc held the cationic charge. The effects of pH to simulate the use of the treated talc in acid and neutral papermaking conditions and the presence of dissolved colloidal substances (anionic trash) to simulate the papermaking process were also measured. The cationic charge of the solutions were evaluated at two pH levels, 4.5 and 7.0. The cationic charge of the talc was higher at pH of 4.5 than at a pH level of 7.0. Although not wishing to be bound by any particular theory, it is believed that this result is due to the predominance of $H^+$ ions in a lower pH solution over the $OH^-$ ions in solution.

In order to assess the effects of anionic trash, filtrate from a groundwood pulp was introduced to the PRP 4440-treated talc solution. The introduction of the anionic trash changed the charge of the talc particles.

Example 2

In this example, four compounds were applied to talc to modify the surface and the treated

| Composition of Handsheet | Visual Ranking |
|---|---|
| 22% Clay, 8% talc (control) | 5 |
| 22% Clay, 8% talc with 1% starch | 3 |
| 22% Clay, 8% talc with 2% starch | 1 |
| 22% Clay, 8% talc with 0.3% Imprint DS | 2 |
| 22% Clay, 8% talc with 0.6% Dowfax WP-310 | 6 |
| 22% Clay, 8% talc with 0.5% Hercobond | 4 |

Treatment of talc with starch and Imprint DS showed a marked reduction in linting propensity. Treatment of talc with Hercobond also showed a reduction in linting propensity.

Example 3

The compounds tested in Example 2, and some additional compounds, were tested again at lower dosages. The same process was followed in preparing the treated talc samples and handsheets were developed. As before, the uncalendered handsheets were examined and ranked by visually assessing the printed strips for cleanliness, with 1 as the best and 10 as the worst. Supercalendered sheets were prepared and subjected to the IGT Fluff test (described in detail in Example 4); however, the amount of fibers picked from the sheets was insufficient to differentiate between the different treatments and, thus, no reliable data was able to be gleaned.

The results of the visual ranking of the uncalendered sheets are shown in Table 4.

TABLE 4

Talc Treatments at Reduced Dosages

| Clay, % | Talc, % | Treatment | Dosage, % | Visual Ranking |
|---|---|---|---|---|
| 28 | 0 | None | None | 2 |
| 22 | 6* | None | None | 6 |
| 22 | ACM, 6 | None | None | 4 |
| 22 | 6 | Imprint DS | 0.01 | 7 |
| 22 | 6 | Imprint DS | 0.05 | 3 |
| 22 | ACM, 6 | Imprint DS | 0.01 | 2 |
| 22 | ACM, 6 | Imprint DS | 0.05 | 2 |
| 22 | 6 | Imprint DS | 0.03 | 2 |
| 22 | ACM, 6 | Imprint DS | 0.03 | 2 |
| 22 | 6 | Starch | 0.04 | 8 |
| 22 | 6 | Starch | 0.07 | 5 |
| 22 | 6 | Starch | 0.1 | 1 |
| 22 | ACM, 6 | Starch | 0.04 | 3 |
| 22 | ACM, 6 | Starch | 0.07 | 3 |
| 22 | ACM, 6 | Starch | 0.1 | 8 |
| 22 | ACM, 6 | Acrosol | 0.5 | 4 |
| 22 | ACM, 6 | CMC | 0.5 | 1 |

Note:
6* is 6 μm talc manufactured by the FEM process, as differentiated herein from the ACM processed talc, 6. This same comment applies to Tables 5 and 6 herein below.

The results indicate that talc treated with either 0.10% starch and 0.50% CMC had the lowest Tinting propensity and appeared to outrank the clay control. The ACM talc treated with Imprint DS ranked the same as the clay control in linting propensity. The results of this example demonstrate that treating the talc before adding it to the paper reduces the linting of the paper.

Example 4

Since only uncalendered sheets were tested to this point, supercalendered sheets were prepared and tested through an IGT Fluff Test. Supercalendering a hand sheet of paper is conducted by passing the sheet between nips of heated rollers at high pressures a certain number of times. This process imparts smoothness for better printability and improves sheet gloss, an important factor in judging supercalendered sheets. In order to perform the IGT Fluff test, the sheets are passed through five (5) stages: the IGT inking unit, the fluff tester, the printability tester, a visual ranking, and a scanner. The IGT inking unit applies oil through an IGT burette to one cylinder and ink to another cylinder. The cylinders are mounted on top of the transfer rollers. A fluff tester is swiped over the entire cross-section of the sheet. The fiber and filler particles from the swiping will be transferred to the ink roller. The ink roller is then mounted to the tester and a strip is printed. The cleanliness of the strip is a measure of the linting propensity of the treatment. If there are several treatments to be visually evaluated, the treatments are grouped in terms of "similar cleanliness" and subsequently graded with respect to each of the treatments in the group. In addition, the strips can be passed through a scanner, which will filter out the background and will count the number of lint/dust particles, quantified by the respective sizes of the particles. The output of the scanner will show the total number of counts over the total area tested.

In addition, a vacuum drainage test was performed on the supercalendered sheets. The vacuum drainage test tests the drainage time through the sheet. In order to perform the vacuum drainage test, a 1 liter Erlenmeyer flask with a side adapter was attached to a vacuum gage. The vacuum gage was operatively attached to a vacuum pump. A constant vacuum was applied and maintained throughout the test. A 500 milliliter slurry, with the additives, dosages, and shear of the talc particles simulating the process requirements, at headbox consistency was prepared using a Britt jar. The slurry was poured into a Buchner funnel and the time for 400 milliliters of water to drain from the slurry was recorded. This time is called the drainage time, which is a measure of the free drainage in a paper making process. The results are shown in Table 5.

TABLE 5

Results of the Vacuum Drainage Test

| Set No. | Clay, % | Talc, % | Treatment | Dosage, % | Time (400 mL) | Max. Vacuum | Steady State Vacuum |
|---|---|---|---|---|---|---|---|
| 3-1 | 28 | 0 | None | 0 | 53 | 16.5 | 14.4 |
| 3-2 | 22 | ACM, 6 | None | 0 | 40 | 16 | 13.3 |
| 3-3 | 22 | ACM, 6 | Imprint DS | 0.01 | 39 | 16 | 13.5 |
| 3-4 | 22 | ACM, 6 | Imprint DS | 0.03 | Not Run | | |
| 3-5 | 22 | 6 | None | 0 | 42 | 16.2 | 14.2 |
| 3-6 | 22 | 6 | Imprint DS | 0.01 | 40 | 16 | 13.5 |
| 3-7 | 22 | 6 | Imprint DS | 0.03 | Not Run | | |
| 3-8 | 22 | ACM, (5 μ), 6 | None | 0 | 46 | 16.3 | 14.2 |
| 3-9 | 28 | 0 | None | 0 | 51 | 16.4 | 14.4 |

The results of Table 5 demonstrate that the 7 micrometer talc produced the fastest drainage, followed by the 5 micrometer talc and clay. Imprint DS treatment also improved drainage time.

The supercalendered sheets were also tested for physical properties like brightness, opacity, gloss, and porosity. The results of these tests are shown in Table 6.

TABLE 6

Physical Properties of Supercalendered Sheets

| Set No. | Clay % | Talc, % | Treatment | Dosage % | Brightness % | Opacity, % | Gloss, % | Porosity | COF Static | COF Kinetic |
|---|---|---|---|---|---|---|---|---|---|---|
| 3-1 | 28 | 0 | None | 0 | 66.8 | 92 | 19.8 | 98 | 0.418 | 0.332 |
| 3-2 | 22 | ACM, 6 | None | 0 | 65.6 | 93.2 | 20.3 | 108 | 0.400 | 0.302 |
| 3-3 | 22 | ACM, 6 | Imprint DS | 0.01 | 67.4 | 91.5 | 19.4 | 130 | 0.404 | 0.316 |
| 3-4 | 22 | ACM, 6 | Imprint DS | 0.03 | 66.8 | 91.6 | 19.1 | 121 | 0.408 | 0.311 |
| 3-5 | 22 | 6 | None | 0 | 67.3 | 91.8 | 21.1 | 101 | 0.404 | 0.304 |
| 3-6 | 22 | 6 | Imprint DS | 0.01 | 66.3 | 93.6 | 18.4 | 127 | 0.408 | 0.311 |
| 3-7 | 22 | 6 | Imprint DS | 0.03 | 67.6 | 92.3 | 19.6 | 147 | 0.399 | 0.310 |
| 3-8 | 22 | ACM, (5 μ), 6 | None | 0 | 66.6 | 91.9 | 25.2 | 82 | 0.395 | 0.307 |

Sheets filled with untreated 5 μm ACM significantly improved gloss and reduced porosity. Thus, the results of the testing show that using a particular size of talc and/or treating the talc will result in lower linting/dusting problems, as well as improving other desirable paper properties.

The top side and bottom side of the supercalendered sheets were tested with the scanner. The sets were visually ranked with respect to the other sets, with the best set getting a rank of 1 and the worst set getting a rank of 7. The results of the scanner testing are shown in Table 7.

TABLE 7

Scanner Counts and Visual Ranking for Top (T) and Bottom (B) Side of Supercalendered Sheets

| Set No. | Counts (T) | Mean Size mm$^2$ (T) | Total mm$^2$ (T) | Visual Rank (T) | Counts (B) | Mean Size mm$^2$ (B) | Total mm$^2$ (B) | Visual Rank (B) |
|---|---|---|---|---|---|---|---|---|
| 3-1 | 28 | 0.23 | 6.58 | 3 | 17 | 0.20 | 3.48 | 2 |
| 3-2 | 21 | 0.23 | 4.8 | 1 | 7 | 0.14 | 0.95 | 1 |
| 3-3 | 45 | 0.22 | 9.84 | 7 | 15 | 0.25 | 3.68 | 7 |
| 3-4 | 27 | 0.28 | 7.47 | 5 | 12 | 0.28 | 3.34 | 5 |
| 3-5 | 20 | 0.27 | 5.37 | 6 | 4 | 0.24 | 0.96 | 4 |
| 3-6 | 15 | 0.20 | 3.02 | 2 | 8 | 0.21 | 1.66 | 3 |
| 3-8 | 20 | 0.24 | 4.81 | 4 | 20 | 0.10 | 2.01 | 6 |

The results of Table 7 demonstrate that the ACM 7 micrometer processed talc without treatment, the FEM processed talc with treatment, the clay control, and the ACM 5 micrometer processed talc without treatment all performed similarly and superior to the remaining sets. These results also indicate that the various treatments respond differently to the process of supercalendering.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

We claim:
1. A paper product having reduced linting and dusting having a modified talc filler wherein the talc filler comprises:
   talc particles, wherein said talc particles have a diameter less than 10 micrometers, are prepared by milling in an air classified mill process, and the surface of said talc particles is modified with a cationic compound such that the talc particles are less hydrophobic and have a cationic charge to increase the affinity of the talc particles to paper fibers.

2. The paper product, as claimed in claim 1, wherein said surface of said talc particles are prepared by a process of:

mixing the talc particles with water to create a slurry; and, adding a cationic compound to the slurry.

3. The paper product, as claimed in claim 2, wherein said cationic compound is selected from the group consisting of cationic wet-end starch, cationic wax-based emulsion, polydadmacs and carboxymethylcellulose.

4. The paper product, as claimed in claim 1, wherein said talc particles have a top size of less than about 1.5%.

5. The paper product, as claimed in claim 1, wherein said talc particles have a top size of less than about 1.0%.

6. The paper product, as claimed in claim 1, wherein said talc particles have a top size of less than about 0.5%.

7. The paper product, as claimed in claim 1, wherein said talc particles have a particle size of about 5 microns.

8. A process for making a paper product having reduced linting and dusting, comprising adding a talc additive to a paper pulp and forming the paper pulp into a paper product, wherein said talc additive comprises talc particles having a size of less than 10 micrometers; and the surface of said talc particles is modified with a cationic compound such that the talc particles are less hydrophobic and have a cationic charge to increase the affinity of the talc particles to paper fibers, and wherein said talc particles are prepared by milling in an air classified mill process.

9. The process, as claimed in claim 8, wherein said surface of said talc particles is modified by:

mixing the talc particles with water to create a slurry; and, adding a cationic compound to the slurry.

10. The process, as claimed in claim 9, wherein said cationic compound is selected from the group consisting of cationic wet-end starch, cationic wax-based emulsion, polydadmacs and carboxymethylcellulose.

11. The process, as claimed in claim 8, wherein said talc particles have a top size of less than about 1.5%.

12. The process, as claimed in claim 8, wherein said talc particles have a top size of less than about 1.0%.

13. The process, as claimed in claim 8, wherein said talc particles have a top size of less than about 0.5%.

14. The process, as claimed in claim 8, wherein said talc particles have a particle size of about 5 microns.

* * * * *

UNITED STATES PATENT AND TRADEMARK OFFICE
CERTIFICATE OF CORRECTION

PATENT NO. : 6,824,651 B2
DATED : November 30, 2004
INVENTOR(S) : Lasmarias et al.

It is certified that error appears in the above-identified patent and that said Letters Patent is hereby corrected as shown below:

Column 5,
Line 38, delete "and the treated" change to -- . -- has been inserted.

Column 6,
Lines 64-64, "The vacuum drainage test tests the drainage time through the sheet." has been deleted.

Signed and Sealed this

Tenth Day of May, 2005

JON W. DUDAS
*Director of the United States Patent and Trademark Office*